(12) United States Patent
Chelnik

(10) Patent No.: US 10,979,852 B2
(45) Date of Patent: Apr. 13, 2021

(54) AFFINITY AND PROXIMITY INFORMATION EXCHANGE SYSTEMS AND METHODS

(71) Applicant: Marc Chelnik, Woodstock, NY (US)

(72) Inventor: Marc Chelnik, Woodstock, NY (US)

(*) Notice: Subject to any disclaimer, the term of this patent is extended or adjusted under 35 U.S.C. 154(b) by 0 days.

(21) Appl. No.: 16/170,133

(22) Filed: Oct. 25, 2018

(65) Prior Publication Data

US 2019/0124471 A1 Apr. 25, 2019

Related U.S. Application Data

(60) Provisional application No. 62/576,707, filed on Oct. 25, 2017, provisional application No. 62/614,534, filed on Jan. 8, 2018.

(51) Int. Cl.
*H04W 4/02* (2018.01)
*H04W 76/10* (2018.01)
*G06F 16/9535* (2019.01)

(52) U.S. Cl.
CPC ........ *H04W 4/023* (2013.01); *G06F 16/9535* (2019.01); *H04W 76/10* (2018.02)

(58) Field of Classification Search
CPC ..... H04W 4/023; H04W 76/10; H04W 64/00; G06F 16/9535

USPC ........................................................ 455/456.3
See application file for complete search history.

(56) References Cited

U.S. PATENT DOCUMENTS

| | | | |
|---|---|---|---|
| 10,019,769 B1* | 7/2018 | Hodge | G06Q 50/26 |
| 2013/0090130 A1* | 4/2013 | Burrell | H04W 4/21 |
| | | | 455/456.1 |
| 2015/0181380 A1* | 6/2015 | Altman | H04L 67/02 |
| | | | 455/457 |
| 2017/0171324 A1* | 6/2017 | Yu | H04W 4/21 |
| 2017/0186232 A1* | 6/2017 | Dange | G06F 3/011 |
| 2018/0150205 A1* | 5/2018 | Rad | G06F 3/0482 |

* cited by examiner

*Primary Examiner* — Charles N Appiah
*Assistant Examiner* — Frank E Donado
(74) *Attorney, Agent, or Firm* — Zeller IP Group PLLC; Keller M. Zeller

(57) ABSTRACT

Embodiments are described herein to identify matching users that share an affinity for particular subjects with a searching user. The embodiments may allow searching users to find and connect with matching users based on parameters, such as physical and/or virtual proximity of the users, one or more shared affinity subjects and/or privacy preferences associated with the users. The embodiments may provide notifications throughout the matching and connecting process and may allow connected users to manually and/or automatically share information with each other.

15 Claims, 8 Drawing Sheets

AFFINITY AND PROXIMITY INFORMATION EXCHANGE SYSTEMS AND METHODS

CROSS-REFERENCE TO RELATED APPLICATIONS

The present application claims benefit of U.S. provisional patent application Ser. No. 62/576,707, titled "Affinity and Proximity Information Exchange Systems and Methods," filed Oct. 25, 2017 and U.S. provisional patent application Ser. No. 62/614,534, titled "Affinity and Proximity Information Exchange Systems and Methods," filed Jan. 8, 2018, each of which is incorporated by reference herein in its entirety.

BACKGROUND

This specification relates generally to systems and methods for matching and connecting users based on proximity preferences and/or shared affinities to facilitate information exchange and other interactions among such users.

Individuals, groups, organizations and other entities often share a mutual affinity or interest in a particular area, topic or subject. For example, entities may share a mutual affinity for subjects such as music, geographic location, history, politics, educational subjects, interactions and others. In many cases, such entities may wish to communicate, interact, or otherwise establish relationships with one another.

Additionally, objects may be created or dynamically programmed such that they are related to one or more subjects (i.e., such that they have an "affinity" for such subjects) and, like entities, it may be beneficial for objects to connect with other similarly programmed objects. Such objects may include, for example, electro-mechanical and/or cybernetic machines and other computer systems; virtual reality or computer simulation "avatars"; reality constructs (e.g., robotics); extensible computer-program-code templates such as "classes" and the like; and/or Internet of Things ("IoT") devices.

Typically, in order for an entity and/or object (i.e., a "searching entity/object") to identify one or more other entities/objects that share a mutual affinity for a particular subject (i.e., "matching entities/objects"), the searching entity/object must conduct a search. For example, a searching entity/object that desires to find matching entities/objects may conduct a database search relating to a particular subject. Upon retrieving search results, the searching entity/object may then have to sort through the results in order to eventually communicate with one or more matching entities/objects.

Unfortunately, a simple database search will not return matching entities/objects that are not included in a searched database and/or that are not associated with a searched subject in the database. Moreover, even if a potential matching entity/object is included in the returned search, it may be difficult or impossible for the searching entity/object to establish a relationship with the matching entity/object. For example, the matching entity/object may not have their contact information listed or they may not be located within the same physical or virtual location as the searching entity/object.

Accordingly, there remains a need for improved systems and methods that identify and match entities/objects having a mutual affinity for one or more subjects. It would be beneficial if such systems and methods could be adapted to determine a physical and/or virtual location of such entities/objects in order to allow matches to be easily filtered by proximity. And it would be further beneficial if such systems and methods allowed entities/objects to set preferences relating to matching parameters and information that may be shared with other entities/objects, while providing notifications relating to determined matches and connections.

SUMMARY

In accordance with the foregoing objectives and others, exemplary methods, systems, apparatuses and software applications are described herein that identify users (e.g., entities and/or objects) that share a mutual affinity for one or more subjects and/or other users. The described embodiments may allow a searching user to find, and connect with, one or more matching users to facilitate an exchange of ideas, information, procedures and/or activities between such users. The described embodiments may further determine and/or allow users to set various preferences, such as proximity preferences, affinity preferences and/or privacy preferences.

In one embodiment, a computer-implemented method is provided. The method may include storing, by a server, first user information associated with a first user. The first user information may include, for example, first contact information, a first location of a first user device, a first proximity preference, first affinity information, a first affinity preference and/or a first privacy preference. The method may further include storing, by the server, second user information associated with a second user. The second user information may include, for example, second contact information, a second location of a second user device, a second proximity preference, second affinity information, a second affinity preference, and/or a second privacy preference. The method may also include determining, by the server, that second user information satisfies the first proximity preference, based on the second location; determining, by the server, that the second user information satisfies the first affinity preference, based on the second affinity information; and transmitting, by the server, to the first user device, a first connection notification including first connection information such as one or more of the second contact information, the second affinity information and the second location. The first connection information included in the first connection notification may be based on the second privacy preference.

In another embodiment, a system is provided. The system may be configured to receive first affinity information from a first user device associated with a first user and second affinity information from a second user device associated with a second user. The system may be further configured to determine a first location of the first user (e.g., the location of the first user device) and a second location of the second user (e.g., the location of the second user device). The system may employ such location information to determine that the first user is within a given proximity threshold of the second user. The proximity system may be further configured to determine that the second affinity information is comparable to the first affinity information (e.g., in relation to one or more subjects and/or on an aggregate basis). And, upon such determination, the system may be configured to transmit one or more notifications to the first user device and/or to the second user device in order to enable the first and second users to communicate (e.g., exchange ideas, information and/or procedures).

In yet another embodiment, an apparatus is provided. The apparatus may include a memory storing first user information associated with a first user, wherein the first user information may include a proximity preference and an affinity preference. The apparatus may also include a processor that is adapted to receive or determine location information associated with a second user; upon determining that the location information satisfies the proximity preference, cause a proximity notification to be provided to the first user; receive affinity information associated with the second user; upon determining that the affinity information satisfies the affinity preference, cause an affinity notification to be provided to the first user; and upon receiving or determining a connection confirmation, cause a connection notification to be provided to the first user.

The details of one or more embodiments of the subject matter of this specification are set forth in the accompanying drawings and the description below. Other features, aspects, and advantages of the subject matter will become apparent from the description and the drawings.

DETAILED DESCRIPTION

Various methods, systems, apparatuses and software applications are described herein to identify matching users that share an affinity for particular subject(s) with a searching user. The described embodiments may allow searching users to find and connect with matching users based on parameters, such as physical and/or virtual proximity of the users, one or more shared affinity subjects and/or privacy preferences associated with the users. The embodiments may provide notifications throughout the matching and connecting process and may allow connected users to manually and/or automatically share information with one another.

Proximity Affinity System

Figure 1:
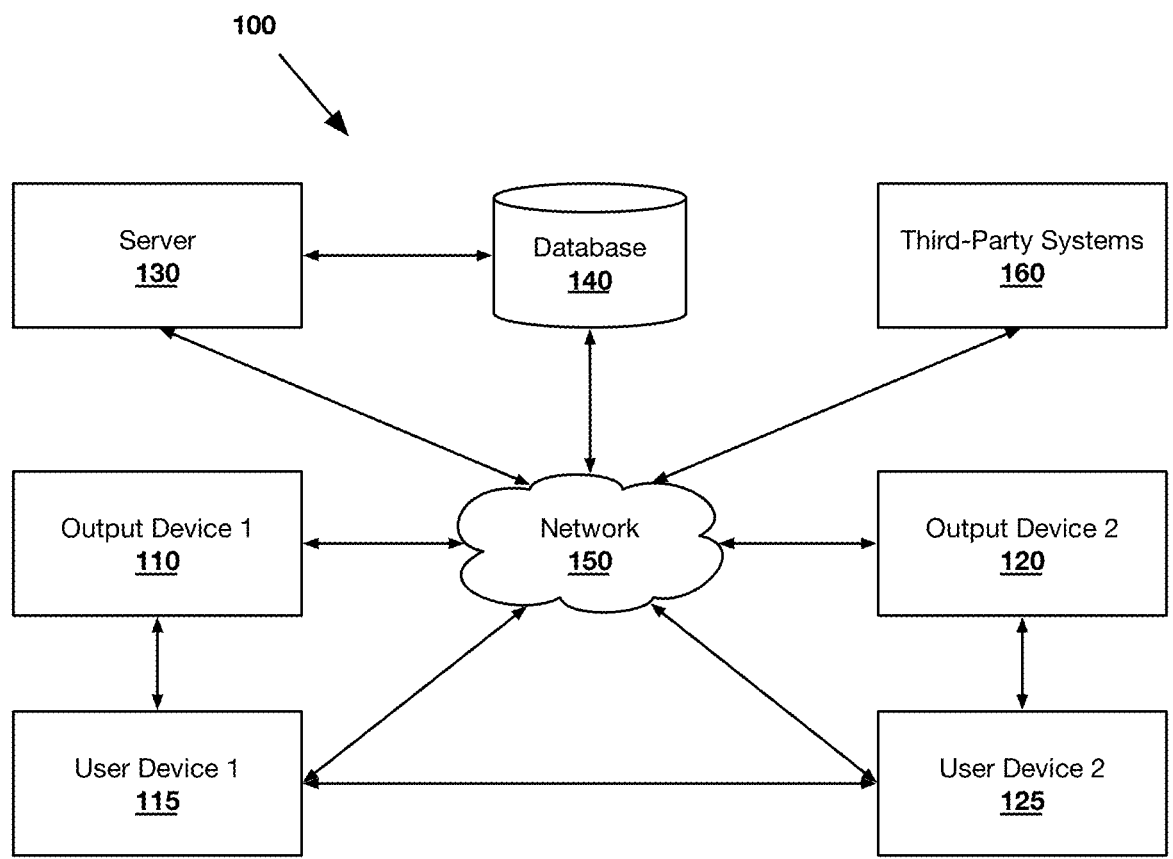
FIG. 1 shows an exemplary proximity affinity system 100 according to an embodiment.

Referring to FIG. 1, an exemplary proximity affinity system 100 in accordance with some embodiments is illustrated. As shown, the system 100 may include a server 130 and a database 140. The server 130 may be adapted to transmit information to and/or receive information from the database 140. It will be appreciated that the database 140 may be internal to the server 130 or may be accessed by the server over a network 150 (e.g., a personal area network ("PAN"), a local area network ("LAN"), a wide area network ("WAN"), the Internet, a cellular network, an intranet network, etc.) or via another wired or wireless connection.

The system 100 further comprises any number of user devices 115, 125 in communication with the network 150. In the illustrated embodiment, the system comprises a first user device 115 and a second user device 125, through which a first user and a second user, respectively, may interact with the proximity affinity system.

As used herein, the term "user" includes, without limitation, entities and objects. Exemplary entities may include, but are not limited to, individuals, groups, organizations, collectives, communities and others. And exemplary object may include, but are not limited to, electro-mechanical and/or cybernetic machines and other computer systems; virtual reality ("VR"), augmented reality ("AR") or computer simulation "avatars"; reality constructs (e.g., robotics); extensible computer-program-code templates such as "classes" and the like; and/or IoT devices. In certain embodiments, users may be categorized based on access privileges, such as administrative users, registered users, third-party users and guest users.

The system may additionally or alternatively include any number of output devices 110, 120 in communication with the network 150. For example, the system may include a first output device 110 and a second output device 120, through which a first and second user, respectively, may receive and/or view notifications provided by the proximity affinity system. Although shown as separate devices, the first user device 115 and the first output device 110 may be a single device. Similarly, the second user device 125 and the second output device 120 may be separate devices or a single device.

The user devices 115, 125 and/or output devices 110, 120 may generally comprise electronic devices, such as but not limited to, general purpose computers, desktops, laptops, smartphones, tablets, and/or wearable devices. As detailed below with respect to FIG. 3, such devices may be adapted to transmit and/or receive information to/from one or more of: a user, the server 130, the database 140, another user device and/or other systems 160 in communication with the proximity affinity system. Accordingly, one or more user devices and/or output devices may be physically attached to the server 130 or may be remotely located from the server 130 and communicatively coupled thereto (e.g., via a network 150). Moreover, such devices may always be in communication with the server 130 (i.e., "online mode") or may be disconnected from the server/network when in use (i.e., "offline mode") and then reconnected to the server/network in order to transfer information. It will also be appreciated that any number of user devices and/or output devices may be communicatively coupled to each other.

The system 100 may further comprise any number of additional devices and/or systems connected via the network 150 (e.g., via an API, SDK or web widget). For example, the system 100 may include one or more third-party systems 160 that may be accessed by the server 130, user devices 115, 125 and/or output devices 110, 120. Exemplary third-party systems 160 may include, but are not limited to: social network systems (e.g., FACEBOOK, TWITTER, LINKEDIN, INSTAGRAM, etc.), chat forums and other commenting systems (e.g., DISQUS, QUORA, REDDIT, etc.), messaging systems (e.g., SMS, MMS, Apple IMESSAGE, FACEBOOK MESSENGER, WECHAT, WHATSAPP, etc.), VR and AR systems, online video game systems (e.g., TWITCH, STEAM, etc.), market research systems, various databases (e.g., "big data" sources), financial systems (e.g., billing, invoicing, and/or accounting systems), contact management systems, customer relationship management ("CRM") systems, calendaring systems, mapping systems, machine learning ("ML") and artificial intelligence ("AI") systems, and others.

The server 130 may communicate with connected third-party systems 160 in order to populate tables in the database 140, with or without user interaction. Moreover, the server 130 may be capable of communicating user-populated and/or system-populated database table entries to third-party systems 160 and may notify users of such communications.

In certain embodiments, the proximity affinity system may comprise a client application installed on (or accessed by) one or more user devices. The client application may be in the form of a desktop application, a native mobile application and/or a web application. Accordingly, a user may download the client application to their user device or may navigate to a website using an internet browser of their device. The client application may communicate with the server 130 via the network 150. Such configuration may allow users of client applications to input information and/or interact with the server application from any location that allows for access to the server.

Exemplary client applications may be adapted to present various user interfaces to users based on access privileges and/or information sent by the system and may allow users to send and receive data. Moreover, as explained below, exemplary client applications may allow users to create and/or modify user information and preferences associated with user profiles. A client application may comprise HTML data, images, icons, and/or executable code. The executable code may be composed in JavaScript, ECMAscript, coffeescript, python, Ruby or other programming languages suitable for execution within the client application, or translation into a client application executable form.

It will be apparent to one of ordinary skill in the art that, in certain embodiments, any of the functionality of a user device may be incorporated into the server, and vice versa. Likewise, any functionality of a client application may be incorporated into a browser-based client, and such embodiments are intended to be fully within the scope of this disclosure. For example, a browser-based client application could be configured for offline work by adding local storage capability and/or could be distributed for various native platforms via a software layer that executes the browser-based program on the native platform.

In one embodiment, communication between a client application and the server may involve the use of a translation and/or serialization module. A serialization module can convert an object from an in-memory representation to a serialized representation suitable for transmission via HTTP or another transport mechanism. For example, the serialization module may convert data from a native Python, Ruby, or Java in-memory representation into a JSON string for communication over the client-to-server transport protocol.

Communications of data between a client application and the server may be continuous and automatic, or may be user-triggered. For example, the user may click a button, causing a client device to send data to the server. Alternately, a client application may automatically send updates to the server periodically, without prompting by a user. If a client application sends data autonomously, the server may be configured to transmit this data, either automatically or on request, to additional user devices and/or output devices.

In one embodiment, the client application may be a standalone application. In such embodiments, the application may provide various features, including but not limited to: messaging features, searching features, subscription features, posting features, group features, polling and/or voting features, favoriting features, news and status feed features and/or others. Such features may be provided via, for example, chat forums, videos, video games, VR and/or AR environments, audio files, links, groups, automatic recommendations, etc.

In other embodiments, the client application may interface with, connect to, or otherwise extend the functionality of other systems or applications (e.g., as a plugin, extension or add-on). For example, the client application may be integrated into, or otherwise extend the functionality of, social networking sites, chat forums and other commenting applications, messaging applications, VR and AR applications and/or various gaming platforms. Generally, the client application may be used with both "open" applications (i.e., applications with few or no particular user requirements) and/or "closed" applications (i.e., applications with stringent user requirements, such as affiliation with one or a select few employers, educational institutions, communities, etc.).

It will be appreciated that any other suitable software, hardware or combinations thereof may be used with the exemplary proximity affinity system 100 and applications disclosed herein. Moreover, such applications may be implemented at any suitable location in FIG. 1 and/or at a location not shown.

Figure 2:
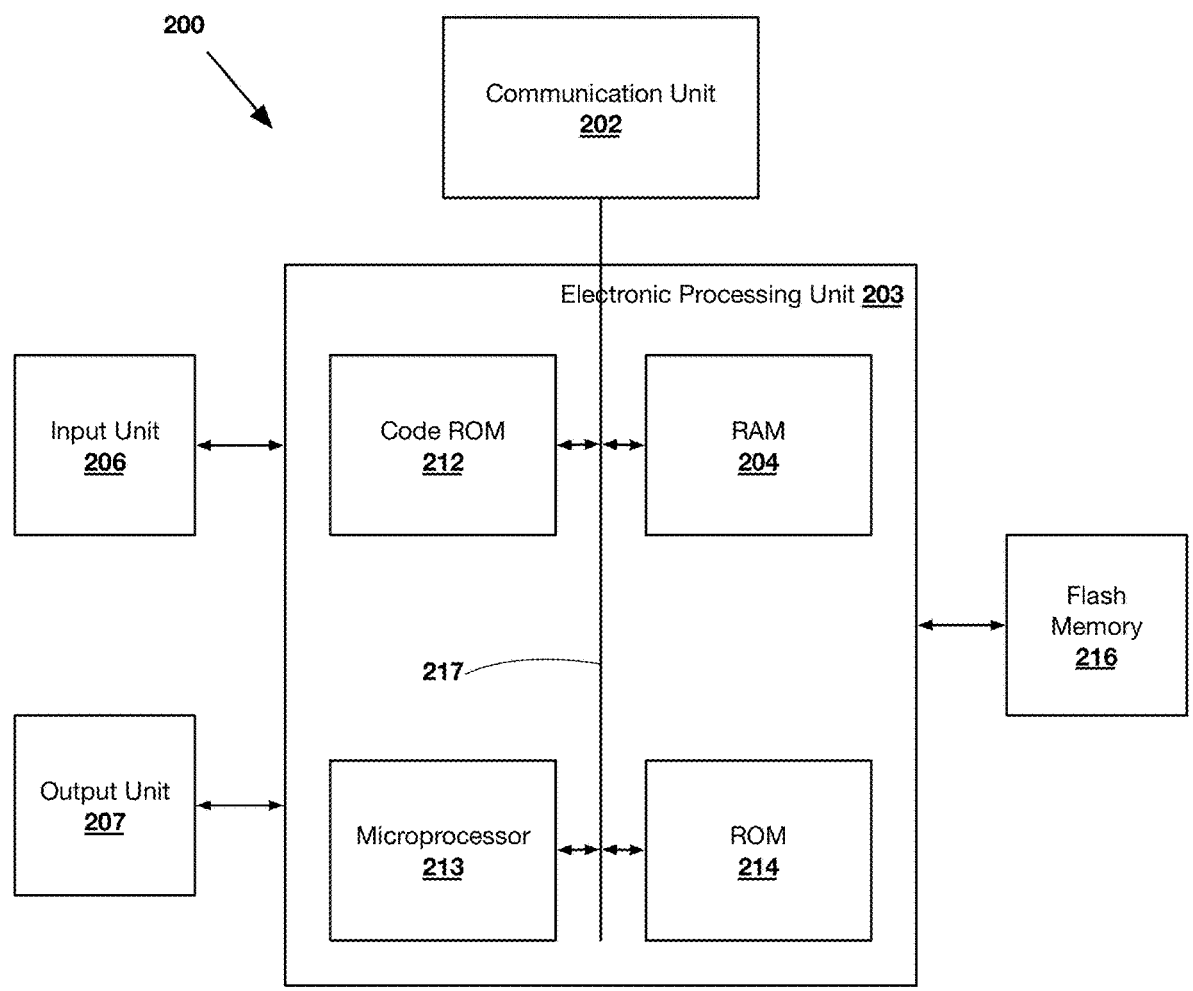
FIG. 2 shows an exemplary server 200 according to an embodiment.

Referring to FIG. 2, an exemplary server 200 according to an embodiment is illustrated. The server 200 may be the same as, or similar to, the server 120 shown in FIG. 1.

The server 200 may comprise a communications unit 202 coupled to a common data and address bus 217 of an electronic processing unit/processor 203. The communications unit 202 may include an interface configurable to communicate with network components and other user equipment within its communication range. To that end, the communications unit 202 may comprise one or more transceivers adapted to communicate via various wired or wireless protocols, such as but not limited to: Wi-Fi, Ethernet, Bluetooth, Bluetooth Low Energy ("BLE"), Near Field Communication ("NFC"), Radio Frequency ID ("RFID"), ZIGBEE, Z-WAVE, Code Division Multiple Access ("CDMA") and/or Global Signal for Mobiles ("GSM").

As shown, the electronic processing unit 203 may include a code read-only memory ("ROM") 212 for storing data for initializing system components of the server 200. The electronic processing unit 203 may further include a microprocessor 213 coupled, by the common data and address bus 217, to one or more memory devices, such as ROM 214, a random access memory ("RAM") 204, and/or a static memory or flash memory 216.

One or more of ROM 214, RAM 204 and flash memory 216 may be included as part of electronic processing unit 203 or may be separate from, and coupled to, the electronic processing unit 203. The one or more memory devices may be configured to store non-transitory computer-executable instructions to allow the electronic processing unit 203 to perform a set of functions including user information collection functions, proximity functions, matching functions and/or notification functions, such as set forth in details below.

In certain embodiments, the server 200 may include one or more input units 206 and/or output units 207, each in electrical communication with the electronic processing unit 203. Exemplary input units 206 may include touch screen devices, keypads, keyboards, pointing devices, cameras, video recorders, microphones, USB ports and others. And exemplary output units 207 may include displays, speakers, and vibration motors.

Figure 3:
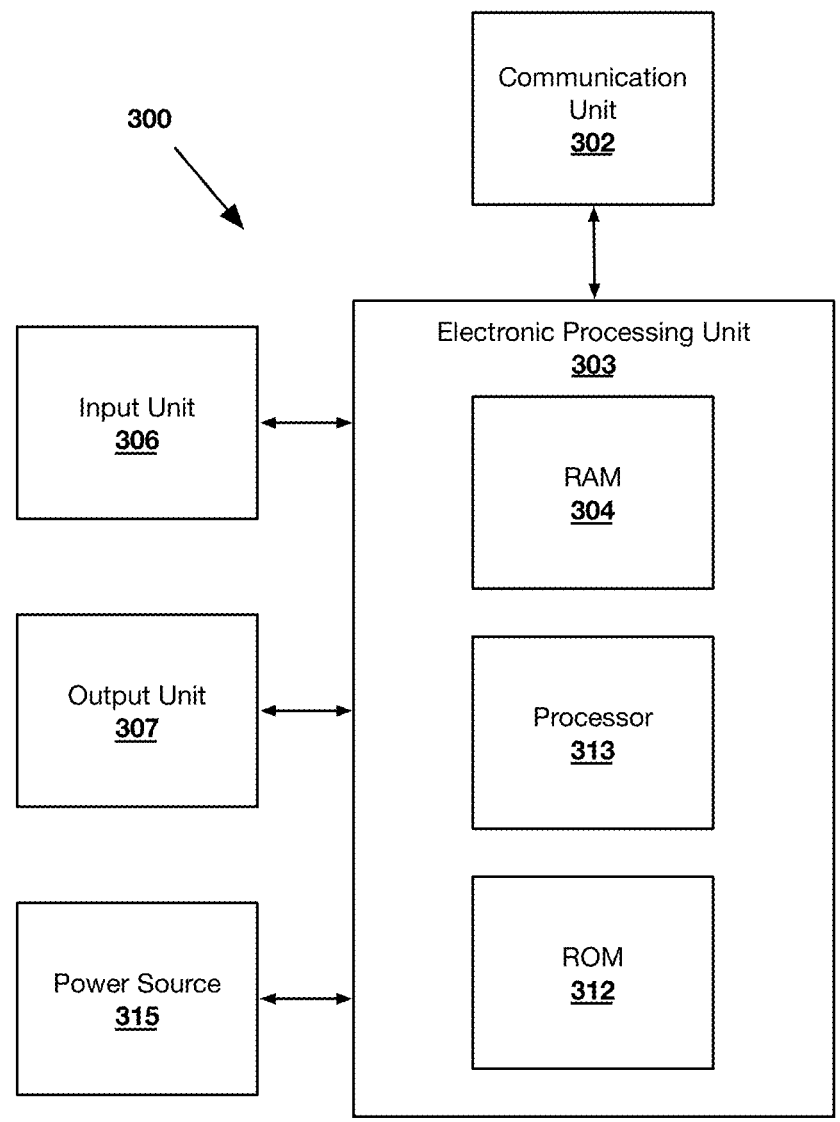
FIG. 3 shows an exemplary output device 300 according to an embodiment.

Referring to FIG. 3, an exemplary user device 300 according to an embodiment is illustrated. The user device 300 may be configured to receive and/or display information provided by the proximity affinity system and/or to receive information from a user. The user device 300 may be similar to, or the same as, the user devices 115, 125 and/or output devices 110, 120 shown in FIG. 1.

As shown, the user device 300 may comprise a communications unit 302. The communications unit 302 may include an interface configurable to communicate with network components and other user equipment within its communication range. Accordingly, the communications unit 302 may comprise one or more transceivers adapted to communicate via various wired or wireless protocols, such as but not limited to: Wi-Fi, Ethernet, Bluetooth, BLE, NFC, RFID, ZIGBEE, Z-WAVE, CDMA and/or GSM. The communications unit 302 may send/receive transmissions that are encrypted and/or asynchronous.

The user device 300 may comprise an electronic processing unit 303, which itself includes a processor 313, such as a general purpose microprocessor, special purpose microprocessor, and/or any other kind of central processing unit ("CPU"). Generally, the processor 313 may modulate, condition, convert, and/or record information.

The user device may also include one or more memory devices, such as a ROM 312, a RAM 304, and/or a static memory or flash memory. Such memory devices may be included as part of electronic processing unit 303 or may be separate from, and coupled to, the electronic processing unit. The one or more memory devices may be configured to store non-transitory computer-executable instructions to allow the electronic processing unit 303 to perform a set of functions including user information collection functions, proximity functions, matching functions and/or notification functions, such as set forth in details below.

In certain embodiments, the user device 300 may include one or more input units 306 and/or output units 307, each in electrical communication with the electronic processing unit 303. Exemplary input units 306 may include touch screen devices, keypads, keyboards, pointing devices, actuators, cameras, video recorders, microphones, location sensors (e.g., Global Positions Satellite ("GPS") sensors), USB ports and others. And exemplary output units 307 may include displays, light emitting diodes ("LEDs"), speakers and/or vibration motors.

The user device 300 may also comprise one or more power sources 315 adapted to power the electrical components of the device. In certain embodiments, the user device may comprise a removable and/or rechargeable power source 315, such as a rechargeable battery. In one embodiment, the provider device may be powered by a lithium-ion battery, which may be adapted for at least eight hours of data collection. In other embodiments, the provider device may be powered by nickel metal hydride cell batteries.

Generally, a user may access and interact with the proximity affinity system via user device running or accessing a client application. In one embodiment, a user who attempts to access the system may be requested to login to an existing account or register a new account through a registration process. The registration process may request information from the user, such as a name, password, address, payment information, email address, alias, and/or other relevant information. Such information may be entered by a user or may be automatically populated from any number of connected systems. If the application is implemented as a plugin, extension or add-on to another application (e.g., marketplace, video game platform, or social network), registration may be unnecessary due to pre-authentication and identification of the user.

Upon creating an account (or otherwise registering), the user may login to the client application to access the system and. In certain embodiments, the user may provide a username and password to login. In other embodiments, the user may employ a connected third-party authentication application to login.

Figure 4:
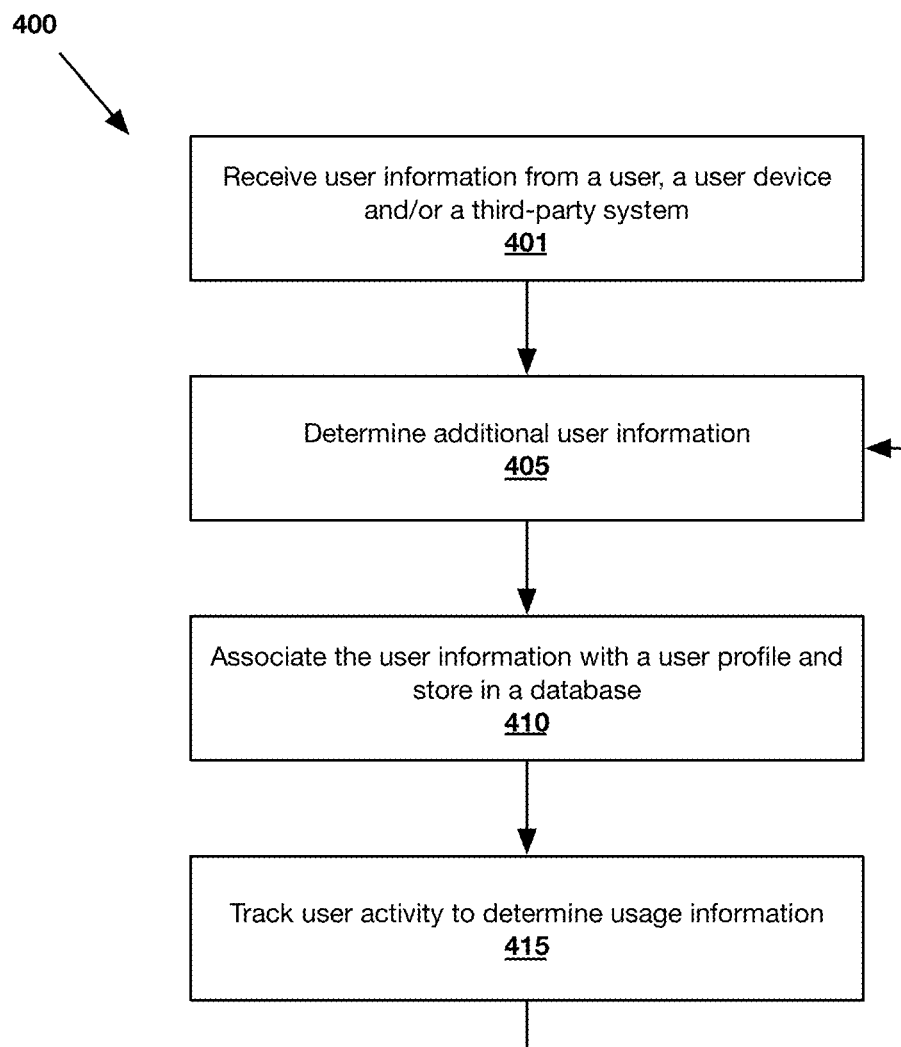
FIG. 4 shows an exemplary method 400 of receiving and determining user information for a given user according to an embodiment.

Referring to FIG. 4, an exemplary method of creating a user profile according to an embodiment is illustrated. As shown, the method begins at step 401, where the system receives user information. Generally, the system may receive and/or determine user information to create and maintain a user profile for each user of the system.

In one embodiment, a profile creation interface may be displayed to each user in order to collect user information. Such interface may comprise, for example, various forms, surveys and/or questionnaires into which a user may input and/or upload user information. The profile creation interface may be displayed to new users during the registration process and/or may be accessed by registered users via one or more links or buttons. Additionally or alternatively, the system may automatically determine user information from one or more user devices associated with the user and/or from one or more connected third-party systems.

Exemplary user information may include, but is not limited to: contact information, affinity information, preferences information, location information (current physical or virtual location; and/or current orientation within a physical or virtual environment) and/or usage information. In some embodiments, user information may also include a unique user ID, one or more unique user device IDs for user devices associated with a user, a password or other security information, and billing information (e.g., credit card or other payment information, billing address, etc.).

Generally, contact information comprises any information that may be useful to identify a user and/or for one user to contact another user. Exemplary contact information for entities may include, for example: username, first name, last name, organization name, images, descriptions, residence, mailing address, phone number, email address, links to websites, social media accounts associated with the user and others. And exemplary contact information for objects my include, for example: a name, a description, an IP address and others.

Exemplary affinity information may include, for example, demographic information associated with a user (e.g., age, gender, religion, ethnicity, language information, income information, educational information, employment information, political affiliation, etc.) and information relating to any number of subjects in which a user has an interest, experience and/or expertise. As used herein a "subject" may relate to one or more of: events (e.g., classes, shows, parties, meetups, meetings, etc.), activities (e.g., networking, dating, working out, playing spots, traveling, learning, programming, teaching, etc.), topics (e.g., politics, sports, educational subjects, religion, research, programming, popular culture, technology, advertising, etc.), locations (e.g., geographic location, virtual location, hometown, neighborhood, church, school, office, online forum, social network, etc.), individuals (e.g., friends, relatives, partners, colleagues, celebrities, etc.), organizations (e.g., sports teams, businesses, charity, government, etc.) and/or brands.

In one embodiment, the user may set or otherwise provide preferences information to assist or instruct the system in: determining matching users, connecting the user with matching users, and/or sharing information with other users. It will be appreciated that the system may additionally or alternatively determine such information and/or include default settings relating to such information.

Exemplary preferences relating to matching include proximity preferences and/or affinity preferences. With respect to proximity preferences, a user may require matching users to be located in a defined geographic area (e.g., a park, a building, a conference room, etc.) or a defined virtual location (e.g., logged into a particular social network, logged into a particular chatroom, located within a particular area within a virtual reality environment, etc.). Proximity preferences may also be based on a relative locations. For example, the user may set a proximity threshold for matching users, such as a maximum distance of the matching user from a geographic location of the user, a maximum distance of the matching user from a particular geographic location, a maximum virtual distance of the matching user from the user's location in a virtual environment and/or a maximum virtual distance of the matching user from a particular location within a virtual environment.

In certain embodiments, the user may additionally or alternatively specify proximity preferences relating to absolute or relative orientation and/or travel direction. For example, the user may specify that matching users must be facing a similar direction as the user or must be traveling in a similar direction as the user, whether in the real world or a virtual environment. In other embodiments, the user may specify that matching users must be traveling to a particular real-world or virtual destination.

With respect to affinity preferences, the user may specify a selection of affinity information to be employed in determining matching users and/or a weighting of such information. As discussed in detail below, the user may require matching users to be associated with: one or more particular types of matching affinity information, one or more exact matches of affinity information, an affinity for one or more specified subjects, a minimum affinity score for one or more specified subjects and/or a minimum aggregate affinity score (discussed below).

Generally, privacy preferences relate to conditions under which the system may notify a user of a matching user, automatically connect the user to a matching user and/or share specific user information with various users. In certain embodiments, a user may allow the system to notify them of a matching user (i.e., other users who satisfy any proximity preferences and/or affinity preferences) and/or automatically connect them to a matching user based on conditions such as: a location of the user (e.g., the user is located in a particular conference room), particular affinity information associated with a potential matching user (e.g., the matching user is employed by a specific company), particular matching affinity information (e.g., both users are interested in robotics), a particularly high affinity score, one or more dates/times (e.g., weekdays from 9 am to 5 pm) and/or others.

In one embodiment, the system may automatically notify/connect a user of/to a matching user who is included in a list of allowed contacts associated with the user's profile. Similarly, in certain embodiments, such automatic notifications/connections may be employed when a matching user is not included in the user's allowed contacts list, but the matching user is connected to another user who is connected to the user and/or who is included in the allowed contacts list.

A user may prevent the system from notifying them of a matching user and/or automatically connecting them to a matching user based on conditions such as: a location of the user (e.g., the user is at home or in the gym), an activity of the user (e.g., the user is exercising or driving), particular affinity information associated with a matching user (e.g., the matching user is under a certain age or employed by a particular employer), particular matching affinity information, an affinity score (e.g., the affinity score is above a minimum, but below an automatic connection threshold), one or more dates/times and/or others.

In one embodiment, the system may refrain from automatically connecting a user to a matching user if the matching user is not included in an allowed contacts list associated with the user's profile. Similarly, the system may refrain from notifying the user of a matching user and/or automatically connecting a user to a matching user who is included in a blocked contacts list associated with the user's profile.

Privacy preferences may also relate to a selection of specific user information (e.g., contact information, affinity information, location information or any other information associated with the user's profile) that may be shared with other users. In certain embodiments, the sharing of particular information may be based on conditions such as: a matching status of another user (a non-matching user, a matching user and/or a connected user), a location of the user, a location of the other user, particular affinity information associated with the other user, particular matching affinity information, an aggregate affinity score, one or more dates/times and/or others.

Privacy preferences may also relate to one or more actions or events that may be taken or executed upon connecting with a connected user. For example, the system may be adapted to automatically transfer one or more files or a payments to the connected user or another system. As another example, the system may be adapted to automatically send a webhook or application program interface ("API") call to a particular web address upon connecting with a user. It will be appreciated that such actions and events may include any user information associated with a user's account and/or may trigger additional actions and events.

In one particular embodiment, the system may provide a temporary privacy option that, when engaged by a user, prevents the system from: allowing other users to find the user in a search, notifying the user of matching users, notifying the user of a connection request, automatically connecting the user with a matching user and/or automatically sharing the user's user information with other users.

At step 405, the system may determine additional user information based on any received or determined user information. As an example, the system may use any received user information to search connected third-party systems for additional user information. As another example, the system may employ artificial intelligence ("AI") applications and/or other algorithms to characterize received affinity information into standardized types and/or categories to allow for comparisons of affinity information between users.

At step 410, once user information is entered into the system and/or automatically determined by the system, such information may be stored (e.g., in a database). Some or all of the stored user information may also be associated with the user's profile.

At step 415, the system may track user activity in order to determine and store usage information relating to a user's use of the system over time. Exemplary usage information may include, but is not limited to: matching users determined for the user, locations of the user and matching users, times when matching users were determined, matched affinity information for each such matching user, information shared with matching users, information received from matching users, notifications sent to the user, responses received from the user and/or any other engagement between the user and matching users. Usage information may also include: connections to matching users, locations where such connections occurred, times when such connections occurred, matched affinity information for each such connection, information shared with a connected user, information received from a connected user, notifications sent to the user, responses received from the user and/or any other engagement between the user and connected users.

In certain embodiments, usage information may be made available to the user for review via one or more user interface screens and/or reports. For example, a user who visits a tradeshow may review their usage information for the show to see all relevant matches, connections and/or engagements and any corresponding details (e.g., affinity information and/or contact information of matching/connected users). Such usage information may also be relevant and applicable to object users (i.e., for the controlling providers or programmers of such objects) to see details of any matching/connected users and/or engagements with such matching/connected users.

In another embodiment, usage information may be made available to an administrative user or a third party for review and/or analysis. Similarly, the usage information may be analyzed by the system or may be transmitted to connected third-party systems (e.g., social media systems and the like). It will be appreciated that the system may enable users to allow or reject the sharing of their usage information with such internal and/or external parties and systems. Moreover, usage information may be scrambled, hashed or encrypted to prevent unauthorized access to such information. And, in certain embodiments, the system may allow a user to turn off the collection of usage information altogether.

Upon determining any usage information, the system may return to step 405. Accordingly, additional user information may be generated based on tracked activities and any determined usage information.

The system may be configured to determine any number of matching users for a given user (i.e. a searching user) based on the searching user's preferences information, and both users' location information and affinity information. The system may be configured to determine matches based on developed algorithms to best define congruencies between users, which may be based on system- and/or user-defined preferences or parameters relating to proximity, affinity information (e.g., specific demographic characteristics and/or subjects, and/or weights assigned to such information), privacy and/or status.

In certain embodiments, a user may meet or discover other users by manual means. For example, a user may find another user by entering information into a search interface searching for certain parameters (e.g. name, commonalities, physical characteristics, traits that one of the users does not possess but finds desirable, etc.). If the entered information matches user information associated with one or more users' accounts, a profile (i.e., a URL) associated with such users may be returned. The searching user may view the returned profiles and/or request to connect with one or more of the returned users.

Users may meet via other additional or alternative means, including but not limited to: profile browsing, introductions by a third party, and/or participating together in an event (e.g. watching and/or reacting to videos, streaming a sports games, playing a video game, etc.). As an example, the user may meet another user on a platform with which the application is integrated, such as social networks, multi-player video games, VR games or events, websites, blogs, chat rooms, business forums, etc.

In certain embodiments, the system may automatically recommend a matching user to a searching user based on proximity information, affinity information and/or preferences information associated with the searching user's profile and the matching user's profile (e.g., commonalities in affinity information, mutual connections, etc.). In some cases, the system may also display one or more reasons for each recommendation while concealing certain underlying user information.

It will be appreciated that such recommendations may be presented to a user and/or withheld from a user depending on both the searching user's preferences and the matching user's preferences. As an example, the system may recommend a matching user to a searching user based on the existence of one or more mutual connections between the user and the matching user. If the mutual connections allow the system to disclose their user information (in whole or in part), the system may display the allowed information to the searching user upon making the recommendation.

Figure 5:
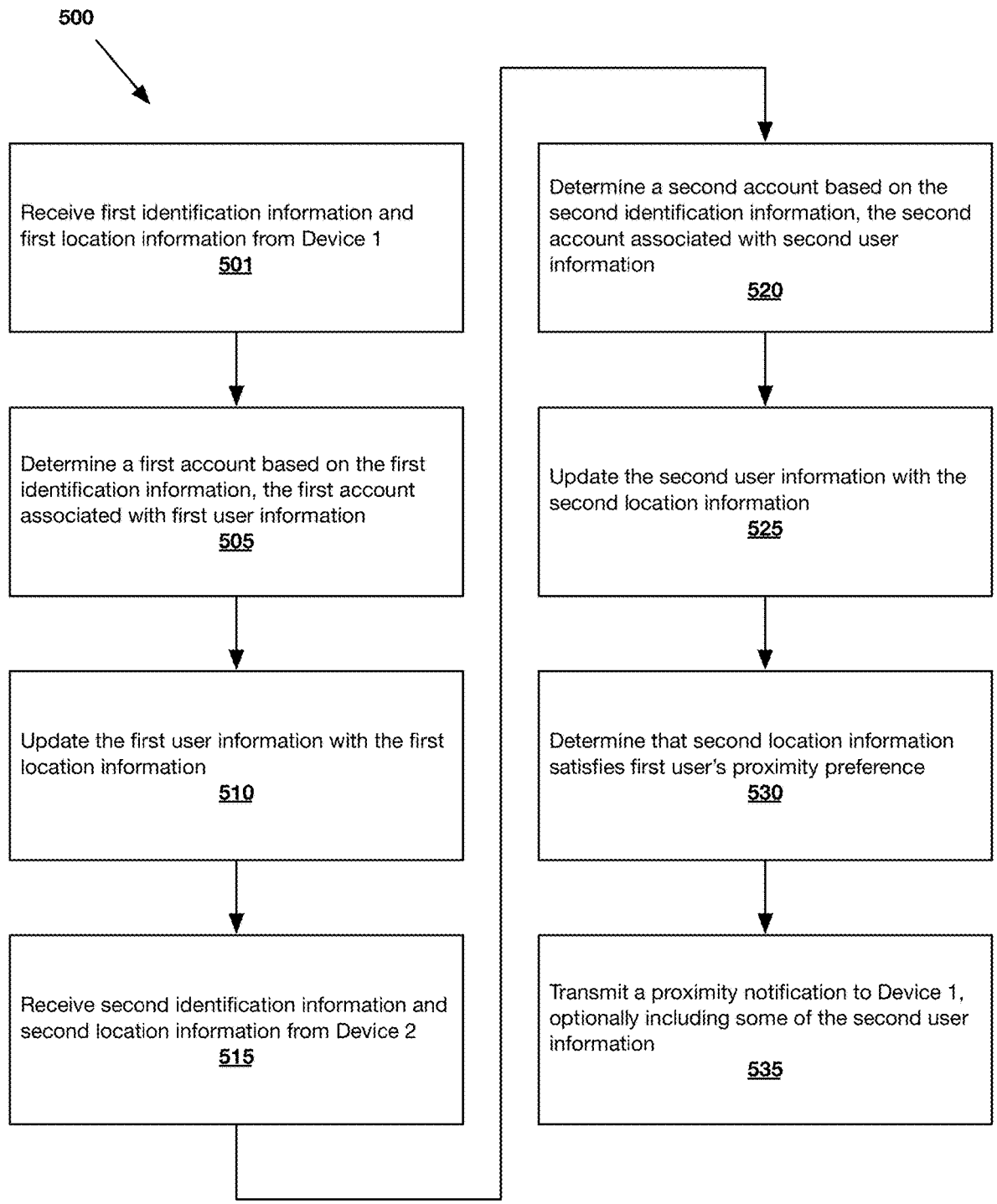
FIG. 5 shows an exemplary method 500 of proximity matching according to an embodiment.

Referring to FIG. 5, an exemplary method of proximity matching according to an embodiment is illustrated. As shown, the method begins at step 501, where the system receives first identification information and first location information from a first user device.

At step 505, the system determines a first account based on the first identification information. As discussed above, the first account may be associated with first user information, such as contact information, affinity information, location information and preferences information. Accordingly, the system may compare the first identification information (e.g., a user ID or a device ID) to user information associated with a plurality of accounts stored in a database to determine an account that corresponds to the received identification information. Upon determining the account corresponding to the first user, the system may update the first user information with the received first location information 510.

At step 515, the system receives second identification information and second location information from a second user device. The system may then determine a second account based on the second identification information 515 and update the second user information with the received second location information 520.

A variety of techniques may be employed to determine the location or position of a user and/or transmit the same to server. In one embodiment, a user device may employ location tracking technology, such as cellular network sensors, GPS sensors, Wi-Fi sensors, accelerometers, gyroscopes, etc.

In other embodiments, location monitoring may occur via a number of wirelessly connected sensors or transceivers such as but not limited to, local Wi-Fi access points, Bluetooth transceivers, BLE transceivers, Bluetooth beacons, NFC transceivers, RFID sensors, responders/tags and/or any combination thereof. Such sensors may be may be integrated into one or more user devices or operated as independent devices. In one embodiment, the sensors may be located throughout a location (e.g., mounted to walls, ceilings, doorways, etc.). In other embodiments, the system may employ such sensors to detect and/or determine the current location of a user using peer-to-peer connectivity At step 525, the system determines that the second location information satisfies a proximity preference of the first user. In one embodiment, matches between users may be based on a proximity of the users at a given time, which may be determined by computing and comparing the users' location information. In such cases, the system may determine that the first user's proximity preference is satisfied based on a comparison of the first user's location information and the second user's location information.

In an alternative embodiment, a proximity preference may relate to an absolute location of a matching user. In such cases, the system may determine that the first user's proximity preference is satisfied based only on the second user's location information.

In certain embodiments, the system may determine a proximity (i.e., nearness) of the users. The system may then determine whether the determined proximity is within one or more proximity thresholds (e.g., a system-defined proximity threshold, a first proximity threshold defined by the first user and/or a second proximity threshold defined by the second user).

Although the term "proximity" may relate to a physical distance between two users (i.e., entities), it is not so limited. In certain embodiments, object users may be "located" at a position within a two- or three-dimensional virtual environment (e.g., avatars located at a position within a video game "map" or simulation). Accordingly, proximity may additionally or alternatively relate to a "virtual" distance between two users.

In some embodiments, users' proximity may be defined by a system of absolute positioning and the relation of the users to such coordinates. In other embodiments, a proximity may be defined by a system of relative positioning determined by the detection of the users' relative positions. As such, proximity and positioning in both the physical world and any number of virtual environments may be based on "relative" positions of users, as broadly defined.

In one embodiment, users' locations and/or any proximity threshold may be defined in a broader sense, such as: users traveling to a certain physical or virtual location within a given time period; machines or systems located in wider geographic positions; and perhaps users (e.g., IoT devices, such as containers or vehicles) traveling on a given road or via the same means of transportation.

In another embodiment, users' proximity might also refer to a "closeness" in a social or business sense. Thus, the proximity of the users might be defined by, for example, friends living in a given area and/or participating in like applications or social media pursuits. In the case of business or perhaps research applications, the proximity of the users might be defined by proximity of the institutions associated with the users or by proximity of divisions of a company associated with the users.

Consider an example where the system uses RFID technology or Bluetooth devices to locate and/or pinpoint users in a given area, such as a room or a public space. The system may determine a first location for a first user and a second location for a second user. Should the two locations be separated by a distance that is less than one or more proximity thresholds (e.g., a predetermined or default proximity threshold, a first user proximity threshold and/or a second user proximity threshold) the system may determine that a proximity match exists.

In executing the proximity functions, the system may execute a procedure or protocol to focus interactions when there are multiple users in a given proximity. That is, the system may be configured to employ filters and/or other algorithms to best detect location. For example, server may determine the focus of location/proximity with regards to many users by, for example, staggering signals so as to allow coupling. In one particular embodiment, the server may determine the focus of location/proximity based on a directional orientation of the users.

In an implementation where the proximity functionality is based upon relative proximity and focus, technologies such as peer-to-peer connectivity or more advanced technologies may be utilized. These technologies could function in coordination with user devices to best determine the range and relative closeness of the users.

At step 535, upon determining that the second user is a proximity match to the first user, the system may transmit a proximity notification to the first user device to notify the user of the match. As discussed in detail below, the proximity notification may include some of the second user's user information.

It will be appreciated that the proximity matching method 500 may be repeated to determine whether the first user is also a proximity match to the second user. If so, the system may also send a proximity notification to the second user and such notification may include some of the second user's user information. Alternatively, the system may send proximity notifications only when both users are proximity matches for each other.

In addition to the above-described proximity matching, the system may also determine affinity matches for users. In one embodiment, the system may first determine a proximity match for two users and then move on to determining whether an affinity match may be established for such users. In other embodiments, the system may first determine an affinity match for two users and then move on to determining whether a proximity match exists. In yet other embodiments, affinity matching and proximity matching may be performed in parallel.

Figure 6:
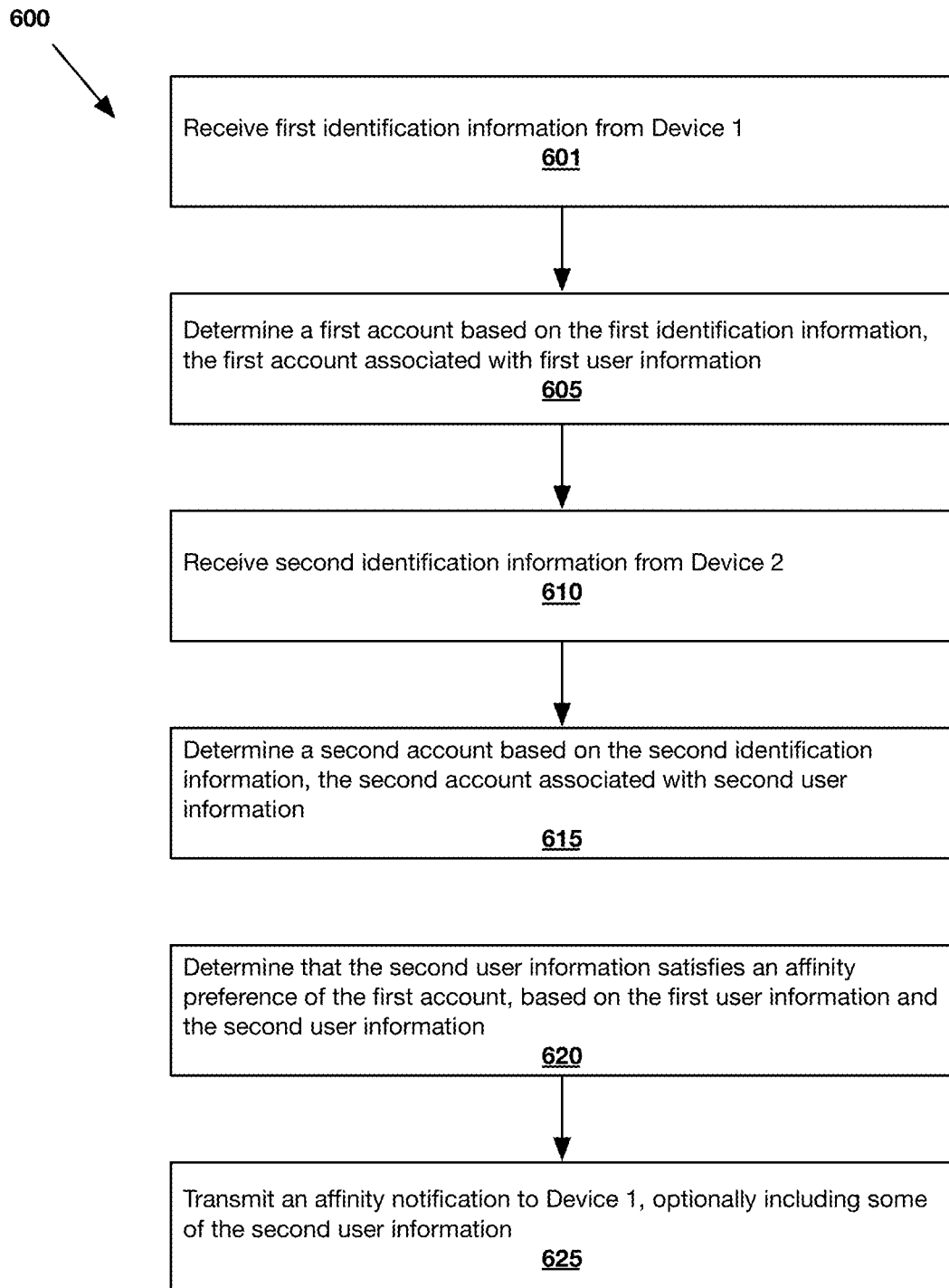
FIG. 6 shows an exemplary method 600 of affinity matching according to an embodiment.

Referring to FIG. 6, an exemplary method 600 of affinity matching according to an embodiment is illustrated. As shown, the method begins at step 601, where the system receives first identification information from a first user device.

As discussed above, the first account may be associated with first user information, such as contact information, affinity information, location information and preferences information. Accordingly, the system may compare the first identification information (e.g., a user ID or a device ID) to user information associated with a plurality of accounts stored in the database to determine an account that corresponds to the received identification information.

At step 610, the system receives second identification information from a second user device. The system may then determine a second account based on the second identification information 615.

At step 620, the system determines that the second user information satisfies an affinity preference of the first account, based on the first user information and the second user information. Generally, the system may determine an affinity match based upon an analysis of the users' respective affinity information, contact information and, optionally, preferences information. In analyzing the users' affinity information, the system may execute algorithms that may be defined and/or evolved over time. Such algorithms may also be adjustable in range and/or scope by users (e.g., by specifying preferences information such as specific affinity information to be matched and/or weights to be applied to such information).

In one embodiment, the system may determine that an affinity match exists when two or more users are associated with similar or identical affinity information. Such affinity matches may have several defined characteristics based on affinity algorithms executed by a server. In establishing mutual affinity between two or more users, the server may convey an overlap of the users' character of affinity, the intensity of affinity and/or shared background.

In one embodiment, the system may determine scores (i.e., "affinity scores") for all affinity information (e.g., demographic characteristics and subjects) associated with a first user, wherein the score relates to the "closeness" or "similarity" of the first user's affinity information as compared to a second user's affinity information. The system may then determine that an affinity match exists between the first and second user if any of the individual scores exceeds an individual affinity threshold. Alternatively or additionally, the system may aggregate the individual scores to determine whether the aggregate affinity score exceeds an aggregate affinity threshold.

It will be appreciated that individual and aggregate affinity thresholds may be manually entered into the system (e.g., by an admin user or registered user) and/or may be automatically determined by the system (e.g., via AI/ML algorithms or other methods). In either case, such thresholds may be automatically updated over time, based on feedback from any number of users.

In certain embodiments, each of the individual affinity scores may first be weighted by the system before comparing scores to an individual affinity threshold and/or before comparing an aggregate score to a total affinity threshold. For example, a user may indicate that first affinity information should be weighted more than second affinity information (e.g., by setting preferences information), and the system may take such weights into account when calculating affinity scores for such information. As a specific example, a user may indicate that they are only interested in matching with other users based on a particular topic (e.g., nuclear fusion research), which may cause the system to: multiply a score relating to that topic by a large weight and/or to multiply scores relating to other affinity information by 0 (or a very small weight).

At step 625, upon determining that the second user is an affinity match to the first user, the system may transmit an affinity notification to the first user device to notify the user of the match. As discussed in detail below, the affinity notification may include some of the second user's user information.

It will be appreciated that the affinity matching method 600 may be repeated to determine whether the first user is also an affinity match to the second user. If so, the system may also send an affinity notification to the second user and such notification may include some of the first user's user information. Alternatively, the system may send affinity notifications only when both users are affinity matches for each other.

Upon determining that a proximity match and/or an affinity match exists between two users, the system may execute notification functions, connection functions and/or sharing functions in order to allow matching users to connect and interact with each other. As discussed above, such functions may take into account any preferences relating to conditions under which the system may notify a user of a matching user, automatically connect the user to a matching user and/or share specific user information with a connected user.

In one embodiment, upon determining that a proximity match and/or an affinity match exists between two users, the system may execute a notification function in order to provide one or more notifications relating to such matches to one or more of such matching users. The system may provide various information to matching users, such as the existence of, and/or information about, a proximity match (i.e., proximity notifications) and/or an affinity match (i.e., affinity notifications). Moreover, upon connecting matching users, the system may provide additional or alternative information relating to a connected user (i.e., connection notifications).

Generally, the notifications provided by the system may comprise: visual notifications (e.g., displayed textual or graphical information, and/or activation of a light), auditory notifications (e.g., spoken information or other sounds that may vary per the situation), and/or sensory notifications (e.g., vibrations, warming, cooling, etc.). It will be appreciated that such notifications may comprise notification information relating to a matching/connected user, such as: proximity information (e.g., the user's location, position or a proximity to the user); affinity information (e.g., particular matching affinity information and, optionally, scores relating to such information); and/or contact information associated with the matching/connected user.

A user may be aware of another user's affinity for a given area of interest based upon the design of the system. In one configuration, a user's affinity for a given area may be openly displayed. In another configuration, a user's affinity for the given area may be sensed or recorded but not displayed. In the case of an object having artificial intelligence, the affinity for an area may be transmitted and received, and may activate a preprogrammed response or a "learning" environment as to develop true AI.

The pattern and configuration of information displayed or otherwise output by output devices can be variously programmed based upon different algorithms to best define the character and level of affinity. In the case of AI and virtual reality, the system may facilitate the transfer of information, instructions or weighted response algorithms.

In one embodiment, the server may transmit notifications to a user device that comprises an integrated output device. In other embodiments, the server may transmit notifications to a user device that is in communication with a separate output device. For example, the server may transmit a notification to smartphone, which then transmits notification information to a separate output device, such as a wearable "badge" or an external display. As another example, a proprietary transceiver may be employed to receive notifications from the server and transmit notification information to a smartphone or other device such that the information may be viewed, heard and/or felt by a user.

It will be appreciated that, in other embodiments, user devices may determine proximity matches and/or affinity matches without interaction from a server. In these embodiments, the user device may simply provide notifications to users and/or may transmit notifications to any connected output devices.

At initial contact, each user receiving a proximity notification and/or an affinity notification may have the ability to accept, reject or respond in a neutral manner. If accepted, the system may continue to display a mutual affinity between two users. If one of the users rejects or responds in a neutral manner to such notifications, the system may enable the users to move on.

Consider an example where a first user and a second user using the proximity affinity system are at an event and both users have indicated similar interests in a given subject. When the first and second users come within a predefined proximity of each other, a green display light may be activated based upon the mutual interest (defined in various ways). For example, when the first and second users walk by each other, a green display light may be activated based upon the mutual interest. Should first and second users acknowledge each other based upon their similar affinity with regards to the subject of interest, another indicator, perhaps a "yellow" indicator may be activated that could further define the subject of interest. Such an acknowledgement/engagement would be an indication of confirmation of a personal affinity.

The proximity affinity system could provide several controls for the users with respect to potential engagements and in response to an engagement. Indicators could be muted or revealed based upon a user's actions or preferences. The proximity affinity system could provide multiple levels of interactivity and affinity, logic and control, on a system wide or individual basis.

Consider an example where, in the case of a trade show, a blue indicator on an output device associated with a user might indicate that the user is a buyer, while a white indicator on an output device associated with a user might indicate that the user is a vendor. When a buyer and a vendor are within a predefined proximity of each other, there could be detailed indicators on the output devices associated with the buyer and vendor to indicate areas of mutual interest or perhaps similarity of geographic home areas (e.g., both are from Chicago), or a congruency of "fields" or areas of interest.

The proximity affinity system may adjust a mode to allow for more specification of detail and affinity depending on the algorithms and programs controlling the interaction. Thus, perhaps when the buyer and vendor seller are within a proximity threshold of each other, the mode may switch to a more detailed mode as to best show overlapping affinities. The immediate result of the interaction of the system would be to allow the two users to break the ice, engage in conversation, exchange ideas and/or develop friendships or collaborations.

When a user is located in a crowded area where multiple potential matching users are present, the system may require the user to agree to and/or acknowledge a current match before the system provides another match. Of course, on an interpersonal level, the matching users will be able to determine if indeed there is a mutual interest or have the ability to disengage.

In certain embodiments, once a first user has connected with a second user, the two users may interact with each other and such interactions may be tracked by the system. Generally, users may interact with each other according to any of the social, digital and/or real-world activities discussed above. Such activities may include, for example: following another user; joining another user's network; manually or automatically disclosing/receiving user information to/from another user; calling or video chatting with another user; watching videos with another user; browsing websites with another user; playing games with another user; viewing or reacting to another user's social activities; and/or selling/purchasing digital or physical products to/from another user.

In one embodiment, the system may provide an interface to allow connected users to exchange messages with one another. Such messages may comprise any format, including one or more of: text, audio, images and/or video. For example, the interface may allow one user to send another user advertising materials, reports and/or information packets. As another example, the interface may allow one user to schedule an event with another user (e.g., by sending a calendar invite or viewing a shared calendar).

In certain embodiments, the system may be further configured to allow a user to rate, rank, review or react to the matched user. A button or a reflex reaction, or any manner of indication may indicate an approval, rejection or neutral status relating to another user. Such response and associated information could be stored by the system and retrieved at a later date. Alternatively, such response could be immediately displayed to the matching user.

The proximity affinity system may further provide other functions/algorithms that are designed for: social media, interpersonal relationships, social amusement, group research and development, and AI machine interfacing, including machine physical interaction/collision control and associated protocols, and machine communication of purpose and associated actions.

In one embodiment, the system may allow users to operate in groups of two or more users so that users in a particular group may disclose their user information to other users or groups. In such embodiments, some or all user information associated with each user who belongs to a group may also be associated with the group (i.e., "group information"). Moreover, users associated with a group may allow other users in the group to share some or all of the group information. As an example, multiple users who belong to a group may each be allowed to share files (e.g., text, images, audio, video, etc.) with other users and/or groups. It will be appreciated that various users who belong to the same group may share differing amounts of information with one another.

FIGS. 7A-7D show exemplary output devices displaying various notifications. In the illustrated embodiment, a first output device 710 associated with a first user is shown along with a second output device 720 associated with a second user. Each output device 710, 720 may comprise a digital badge that includes a proximity indicator 711, 721, an affinity indicator 712, 722 and a status indicator 713, 723.

In one embodiment, the output devices 710, 720 may be configured to receive notifications from a server and to display notification information associated with such notifications (e.g., via the proximity indicators 711, 721 and/or affinity indicators 712, 722). The output devices may be further configured to receive a status and/or a response from an associated user, such that the devices may display corresponding status/response information (e.g., via a status indicator 713, 723).

The proximity indicator 711, 721 of a given output device 710, 720 may display notification information corresponding to received proximity notifications. For example, a proximity indicator 711, 721 may display information relating to the existence and/or location of another user who satisfies a proximity preference associated with the device's user's account. In one particular embodiment, the proximity indicator of a given output device may light up to indicate that another user is within a predetermined proximity threshold of the associated user. Additionally or alternatively, the proximity indicator of a given device may change colors or brightness to indicate proximity of another user (e.g., the brightness may increase as the users move closer to each other and/or may decrease as the users move away from each other).

In one particular embodiment, the color of a proximity indicator may convey information about the matching party. For example, the proximity indicator 711 of the first output device 710 may light up in the same color as the proximity indicator 721 of the second output device 720 to allow the first and second users to find each other.

The affinity indicator 712, 722 of a given output device 710, 720 may display notification information corresponding to received affinity notifications. For example, the affinity indicator may display information relating to the existence and/or specifics of matching affinity information. In one embodiment, the affinity indicator of a given output device may illuminate to indicate that an affinity information match exists between the associated user and another user. In another embodiment, the affinity indicator of a given device may change colors to indicate a particular match of an associated user's demographic characteristic and/or subject to that of another user. In yet another embodiment, the affinity indicator 712, 722 of a given output device 710, 720 may illuminate in a particular color upon the occurrence of an affinity match, where the color may indicate the overall strength of a match (i.e., based on an individual score or an aggregate score).

The status indicator 713, 723 of an output device 710, 720 may display status information relating to the associated user's degree of openness/receptivity to being matched with any other users and/or to being matched with a specific user. In one embodiment, the status indicator may simply illuminate upon the occurrence of a proximity match and an affinity match. In other embodiments, a user may set their status to private, which causes their status indicator not to activate in the event of a match or to remain activated in a particular color (e.g., red) indicating that the user is not interested in connecting with other users.

Figure 7A:
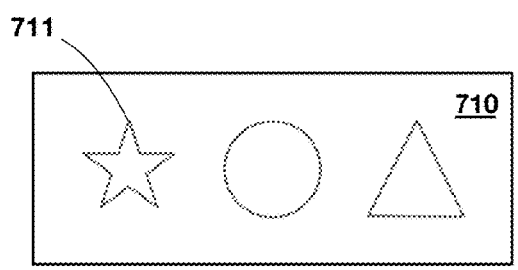
FIGS. 7A-D show exemplary output devices 710, 720 displaying various notifications according to an embodiment.
Figure 7A:
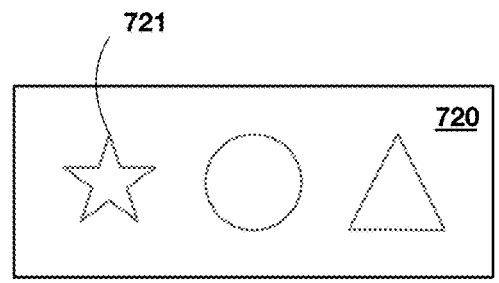

Referring to FIG. 7A, a first output device 710 is located at a first location and the second output device 720 is located at a second location. As shown, the proximity indicator 711 of the first output device 710 is inactive, because the second location does not satisfy a proximity preference associated with the first user's account. For example, the second location may be farther than a predetermined maximum distance from the first location or may be outside of a predetermined area.

Similarly, the proximity indicator 721 of the second output device 720 is also inactive, because the first location does not satisfy a location preference associated with the second user's account. For example, the first location may not be within a specific geographic location and/or may not be within a proximity threshold defined by the second user.

Figure 7B:
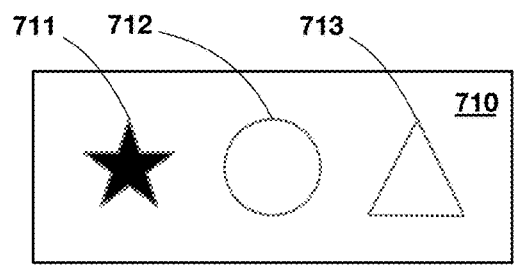
Figure 7B:
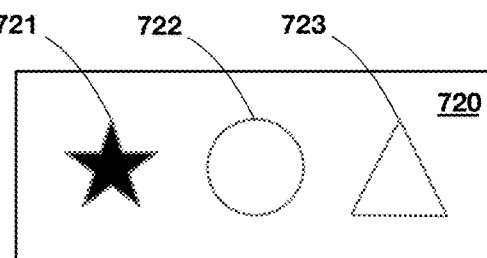

Referring to FIG. 7B, when the users of the first output device 710 and second output device 720 are located within a predefined proximity threshold of each other, the system may transmit a proximity notification to both output devices 710 and 720. Upon receiving such notification, proximity indicators 711 and 721 may become activated and may provide a visual, audible and/or sensory alert to indicate the affinity match.

As shown, the proximity indicator 711 of the first output device 710 is now active because the first location, second location or both have changed such that the updated second location satisfies a proximity preference associated with the first user's account. The proximity indicator 721 of the second output device 720 is also active because the updated first location satisfies a proximity preference associated with the second user's account.

In one embodiment, the system may determine that the devices are within a predetermined proximity threshold according to the following steps. First, the first output device 710 may transmit a first signal to a server comprising a location of the first user and/or a location of the first device. Second, the second output device 720 may transmit a second signal to the server comprising a location of the second user and/or a location of the second device. And third, upon receiving such location information, the system may determine that the second device is within a predetermined proximity threshold of the first device, and the first device is within a predetermined proximity threshold of the second device.

Figure 7C:
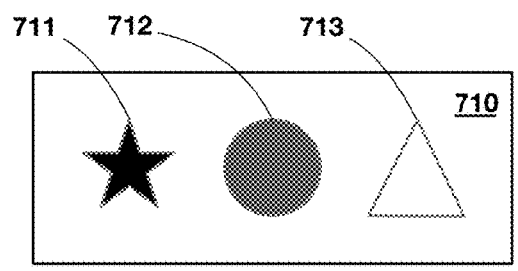
Figure 7C:
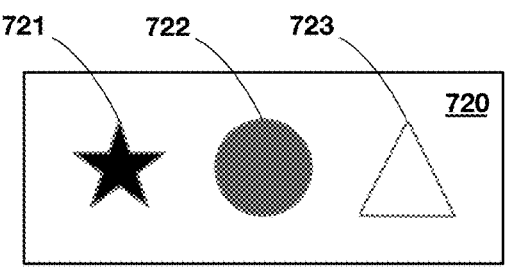
Figure 7D:
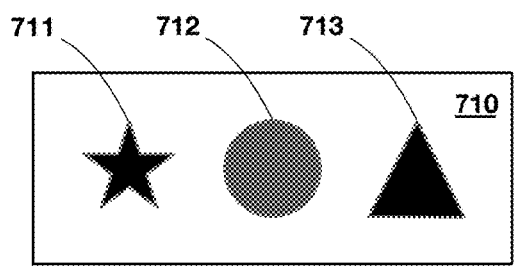
Figure 7D:
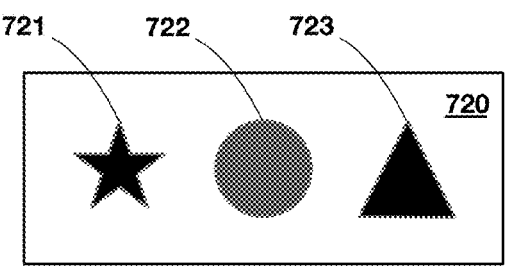

Referring to FIG. 7C, both the first output device 710 and second output device 720 may be associated with various affinity information and any number of affinity preferences. The system may compare the affinity information of both devices in order to determine whether the affinity information of the second output device satisfies the affinity preferences of the first device. If so, the system may transmit a first affinity notification to the first device 710 and, upon receiving the notification, an affinity indicator 712 of the first device may provide a visual, audible and/or sensory alert to indicate the affinity match.

Similarly, the system may compare the affinity information of both devices in order to determine whether the affinity information of the first output device satisfies the affinity preferences of the second device. If so, the system may transmit a second affinity notification to the second device 720 and, upon receiving the notification, an affinity indicator 722 of the second device may provide a visual, audible and/or sensory alert to indicate the matching affinity information.

Although each of the output devices is shown to include a single affinity indicator, it will be appreciated that, in other embodiments, output devices may comprise any number of such indicators. For example, an output device may comprise a first affinity indicator adapted to display information relating to the existence and/or specifics of first affinity information. And the output device may further comprise a second affinity indicator adapted to display information relating to the existence and/or specifics of second affinity information.

In one embodiment, the system may determine that an affinity match exists for both devices, because the second user is included within a list of allowed users associated with the first user, and the first user is included within a list of allowed users associated with the second user. Alternatively, the system may make the affinity match determination based on affinity preferences associated with each user and a comparison of each user's associated affinity information In FIG. 7D, a status indicator 713 of the first output device 710 is activated to indicate the first user's desire to connect with the second user. Similarly, a status indicator 723 of the second output device 720 is activated to indicate the second user's desire to connect with the first user. In certain embodiments, the first and second users may view each other's status indicators, which may allow them to confidently approach each other in order to communicate.

In certain embodiments, the status indicator may automatically activate without requiring input from a user. For example, the indicator may automatically activate when a user has previously indicated that they want to connect with the matching user (i.e., the matching user is included within a user's list of allowed users). As another example, the status indicator may be automatically activated (or inactivated) by the system based upon survey information or gathered information and the intersection of any two users determined by a control database algorithm. And as yet another example, an admin user may activate (or inactivate) a status indicator.

In other embodiments, the status indicator may require input from a user before becoming activated. For example, an output device (or separate user device) may comprise an actuator that, when actuated by a user, causes a state of a status indicator to change. In such embodiments, a user may receive proximity and affinity notifications relating to a matching user and, in response, the user may press a button to confirm the match and activate the status indicator. Accordingly, the matching user may view the user's activated status indicator and understand that the user wants to connect. Alternatively, the user may not press the button and their status indicator will not activate.

Figure 8:
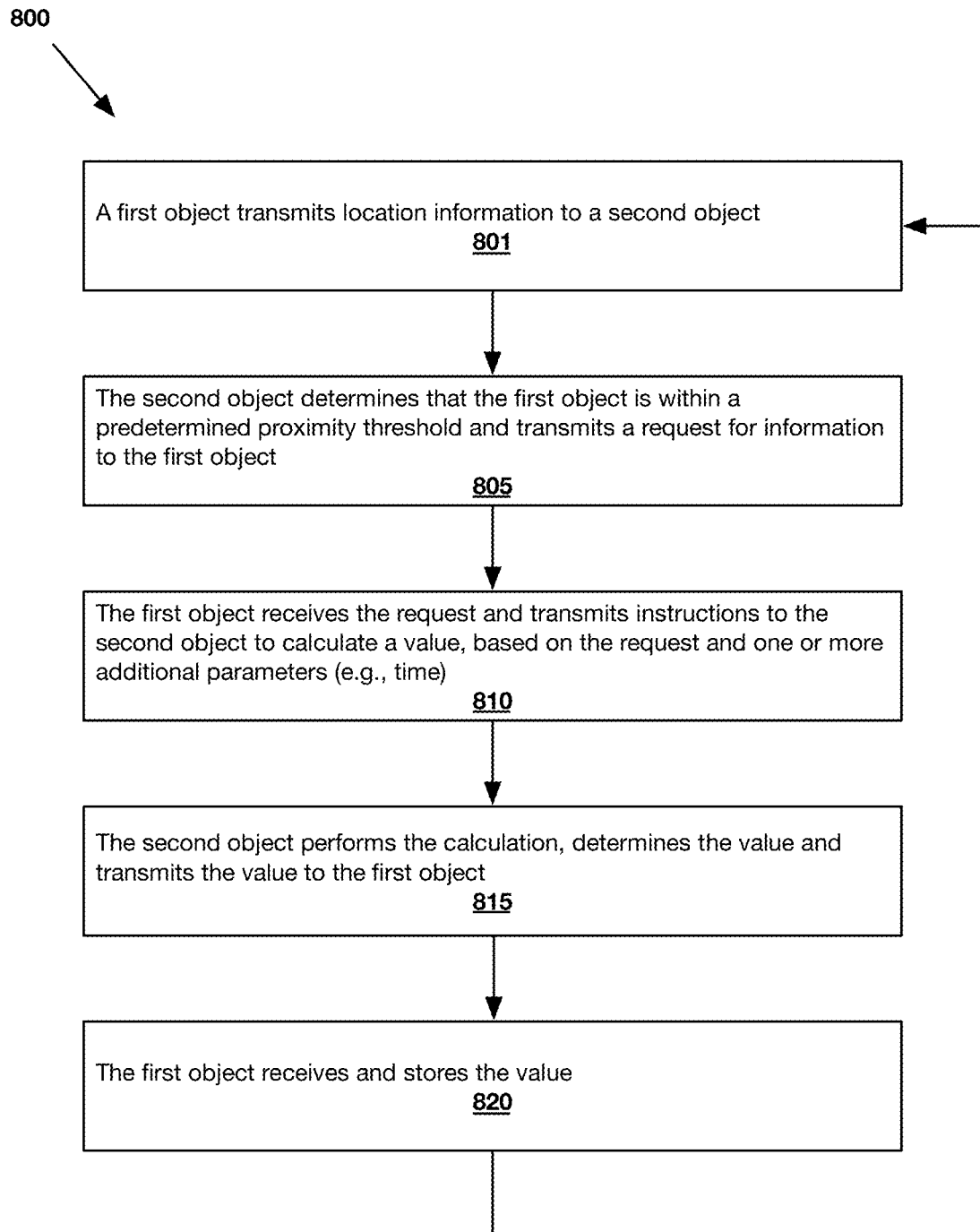
FIG. 8 shows an exemplary method 800 of matching and connecting objects according to an embodiment.

Referring to FIG. 8, an exemplary method 800 of connecting objects according to an embodiment is illustrated. As shown, the method begins at step 801, where a first object transmits location information to a second object.

At step 805, the second object determines that the first object is within a predetermined proximity threshold and the second object transmits a request for information to the second object.

At step 810, the first object receives the request from the second object and transmits instructions to the second object to calculate a value based on the request and one or more additional parameters (e.g., time).

At step 815, the second object receives the instructions from the first object and performs calculations based on the received instructions. For example, the second object may calculate the value based on the received one or more additional parameters. Upon calculating the value, the second object may transmit the results to the first object.

Finally, at step 820, the first object receives the results from the second object. The first object may then store the value, transmit it to another object, and/or use the value for various other calculations. The method may then be repeated as desired or required.

The above-described embodiments may range from a form of entertainment to a productive system that facilitates the exchange of ideas and relationships. For example, the system may be employed for: casual gatherings, various types of environments, a continuum of "out in the open/on the street" experiences, special events, social media, research conferences, development teams, sales conferences, corporate conferences, and/or technical applications for AI and/or virtual reality. In the case of AI and/or virtual reality, the system may comprise a control system of interactivity.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of CPU. Generally, CPU will receive instructions and data from a ROM and/or a RAM. The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a GPS receiver, or a portable storage device (e.g., a USB flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a LAN and a WAN, e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method comprising:

storing first user information associated with a first user, the first user information comprising first contact information, a first location of a first user device, a first proximity preference, first affinity information and a first affinity preference, wherein the first affinity preference specifies a required affinity included in the first affinity information and an additional required affinity that is not included in the first affinity information;

storing second user information associated with a second user, the second user information comprising second contact information, a second location of a second user device, a second proximity preference, second affinity information comprising the required affinity and a second affinity preference;

upon determining that the second user information satisfies the first proximity preference, based on the second location, transmitting a first proximity notification to a digital badge in communication with the first user device to thereby cause a proximity indicator associated with the digital badge to activate, wherein the determining that the second user information satisfies the first proximity preference is based on a comparison of the first location to the second location and the first proximity preference relates to a maximum distance within which the second user device must be located, and the maximum distance relates to a two or three-dimensional virtual environment;

upon determining that the second user information satisfies the first affinity preference, based on the second affinity information comprising the required affinity and the additional required affinity, transmitting a first affinity notification to the digital badge to thereby cause an affinity indicator associated with the digital badge to activate, wherein the first affinity preference specifies that the second affinity information must be associated with an aggregate affinity score that meets or exceeds a minimum aggregate affinity score; and based on having made a determination that the aggregate affinity score has been met or exceeded and that the second user information has satisfied the first proximity preference, transmitting, to the digital badge via the first user device, a first connection notification including first connection information comprising one or more of the second contact information, the second affinity information and the second location.

2. A method according to claim 1, wherein:
the first user information further comprises a first privacy preference;
the second user information further comprises a second privacy preference; and
the first connection information included in the first connection notification is determined based on the second privacy preference.

3. A method according to claim 2, further comprising:
determining that the first user information satisfies the second proximity preference, based on the first location;
determining that the first user information satisfies the second affinity preference, based on the first affinity information; and
transmitting, to the second user device, a second connection notification including second connection information comprising one or more of the first contact information, the first affinity information and the first location,
wherein, the second connection information included in the second connection notification is based on the first privacy preference.

4. A method according to claim 1, wherein:
said first proximity preference relates to an area within which the second user device must be located; and
said determining that the second user information satisfies the first proximity preference is based on a determination that the second location is within the area.

5. A method according to claim 4, wherein the area relates to a virtual environment.

6. A method according to claim 1, wherein each of the first affinity information and the second affinity information relates to one or more of the group consisting of:
an age, a gender, an ethnicity, a language, a religion, an employer, an event, a task, an activity, a communication, a file, a show, a meeting, a class, a political topic, a sports topic, an educational subject, a religious topic, a research topic, a popular culture topic, a technology topic, an advertising topic, a geographic area, a virtual environment, a religious institution, an educational institution, an online forum, a social network, an individual, a sports team, a business, a charity, a government and a brand.

7. A method according to claim 6, wherein:
the required affinity relates to an individual; and
the second affinity information comprises information relating to the individual.

8. A method according to claim 1, wherein each of the first contact information and the second contact information comprises one or more of the group consisting of: a username, a unique ID, a name, one or more images, a residence, a mailing address, a phone number, an email address, a website, and an online account.

9. A method according to claim 1, further comprising:
receiving a connection confirmation,
wherein the first connection notification is transmitted to the first user device and/or the digital badge upon receiving the connection confirmation, and
wherein said transmitting the first connection notification causes a status indicator associated with the digital badge to activate.

10. A method according to claim 1, wherein a portion of the first affinity information is automatically determined or categorized.

11. A method according to claim 1, further comprising:
determining, for the first user, an interaction relating to the second user; and
transmitting a report to the first user device comprising information relating to the interaction.

12. A method according to claim 1, wherein the notification comprises one or more of an instruction, an event, a file, contact information, affinity information and location information.

13. A method according to claim 1, further comprising:
receiving, from the digital badge, a connection confirmation,
wherein the connection confirmation is received upon actuation of an actuator associated with the digital badge by the first user; and
upon receiving the connection confirmation, transmitting, to the second user device, a second connection notification including second connection information comprising one or more of the first contact information, the first affinity information and the first location.

14. A proximity affinity apparatus comprising:
a memory storing:
first user information associated with a first user, the first user information comprising a first location of the proximity affinity apparatus, a first proximity preference, first affinity information, and a first affinity preference, wherein the first affinity preference specifies a required affinity included in the first affinity information and an additional required affinity that is not included in the first affinity information; and
second user information associated with a second user, the second user information comprising second contact information, a second location of a second proximity affinity apparatus, a second proximity preference, second affinity information comprising the required affinity and a second affinity preference;
a proximity indicator associated with a digital badge;
an affinity indicator associated with the digital badge;
a display;
an actuator; and
a processor adapted to:
receive or determine location information associated with a second user of the second proximity affinity apparatus;
upon determining that the location information satisfies the proximity preference, cause a proximity notification to be provided to the first user via the proximity indicator to thereby cause the proximity indicator associated with the digital badge to activate, wherein the determining that the second user information satisfies the first proximity preference is based on a comparison of the first location to the second location and the first proximity preference relates to a maximum distance within which the second user device must be located, and the maximum distance relates to a two or three-dimensional virtual environment;

receive second affinity information associated with the second user, wherein the second affinity information comprises the required affinity;

upon determining that the second affinity information satisfies the first affinity preference based on the second affinity information comprising the required affinity and the additional required affinity, cause an affinity notification to be provided to the first user via the affinity indicator to thereby cause the affinity indicator associated with the digital badge to activate, wherein the first affinity preference specifies that the second affinity information must be associated with an aggregate affinity score that meets or exceeds a minimum aggregate affinity score; and display, via the display, a connection notification relating to the second user; and upon determining that the actuator has been actuated by the first user; that the aggregate affinity score has been met or exceeded and that the second user information has satisfied the first proximity preference:

transmit, to the digital badge via the first user device, a connection notification including connection information comprising one or more of the second contact information, the second affinity information and the second location information associated with the second user of the second proximity affinity apparatus.

15. A proximity affinity apparatus according to claim 14, wherein the affinity notification comprises an intensity.

* * * * *